(12) United States Patent
Berard et al.

(10) Patent No.: US 7,659,334 B2
(45) Date of Patent: Feb. 9, 2010

(54) IMPACT RESISTANT RIGID VINYL CHLORIDE POLYMER COMPOSITION AND METHOD OF MAKING THE SAME

(75) Inventors: Mark T. Berard, Baton Rouge, LA (US); Charles M. Vanek, Baton Rouge, LA (US)

(73) Assignee: Dow Global Technologies, Inc., Midland, MI (US)

( * ) Notice: Subject to any disclaimer, the term of this patent is extended or adjusted under 35 U.S.C. 154(b) by 0 days.

(21) Appl. No.: 12/282,905

(22) PCT Filed: Mar. 14, 2007

(86) PCT No.: PCT/US2007/006407

§ 371 (c)(1),
(2), (4) Date: Sep. 15, 2008

(87) PCT Pub. No.: WO2007/109042

PCT Pub. Date: Sep. 27, 2007

(65) Prior Publication Data

US 2009/0093577 A1    Apr. 9, 2009

Related U.S. Application Data

(60) Provisional application No. 60/783,237, filed on Mar. 17, 2006.

(51) Int. Cl.
*C08K 5/00* (2006.01)
*C08K 5/09* (2006.01)

(52) U.S. Cl. ........................ 524/284; 524/322

(58) Field of Classification Search ............. 524/284
See application file for complete search history.

(56) References Cited

U.S. PATENT DOCUMENTS

| | | | |
|---|---|---|---|
| 2,586,363 A | 2/1952 | McAlevy | |
| 3,006,889 A | 10/1961 | Frey et al. | |
| 3,209,055 A | 9/1965 | Hedberg et al. | |
| 3,296,222 A | 1/1967 | Dixon et al. | |
| 3,299,014 A | 1/1967 | Kalil | |
| 3,454,544 A | 7/1969 | Young et al. | |
| 4,060,508 A | 11/1977 | Sugahara et al. | |
| 4,185,075 A | 1/1980 | Ellis et al. | |
| 4,267,084 A * | 5/1981 | Mizutani et al. | 524/527 |
| 4,279,807 A * | 7/1981 | Dworkin | 524/119 |
| 4,591,621 A | 5/1986 | Ennis | |
| 4,767,823 A | 8/1988 | Jones et al. | |
| 4,873,005 A | 10/1989 | Hyde | |
| 5,242,987 A | 9/1993 | Brugel | |
| 5,248,546 A * | 9/1993 | Greenlee | 428/212 |
| 5,272,236 A | 12/1993 | Lai et al. | |
| 5,278,272 A | 1/1994 | Lai et al. | |
| 5,789,453 A | 8/1998 | Detterman | |
| 5,925,703 A | 7/1999 | Betso et al. | |
| 5,985,959 A | 11/1999 | Harvey et al. | |
| 6,124,406 A | 9/2000 | Cinadr et al. | |
| 6,140,403 A | 10/2000 | Grossman | |
| 6,573,318 B2 | 6/2003 | Duvall et al. | |
| 6,706,815 B2 | 3/2004 | Marchand et al. | |
| 6,849,694 B2 | 2/2005 | Hata | |
| 6,900,254 B2 | 5/2005 | Wills et al. | |

FOREIGN PATENT DOCUMENTS

| | | |
|---|---|---|
| EP | 052976 | 6/1982 |
| EP | 0529576 | 3/1993 |
| GB | 1 581 686 | 12/1980 |
| JP | 02-045543 | 2/1990 |
| JP | 07-011085 | 1/1995 |
| WO | WO-96/03441 | 2/1996 |

OTHER PUBLICATIONS

Wickson, Edward J., Handbook of Polyvinyl Chloride Formulating, 1993, p. 376, John Wiley & Sons, New York.
International Search Report (PCT/US2007/006407).

* cited by examiner

*Primary Examiner*—Ling-Siu Choi
*Assistant Examiner*—Hui Chin

(57) ABSTRACT

The instant invention is an impact resistant rigid vinyl chloride polymer composition, and method of making the same. The impact resistant rigid vinyl chloride polymer composition, according to instant invention, includes a vinyl chloride polymer, an impact modifier, and a lubricant system. The impact modifier includes a chlorinated olefin polymer, and an ethylene/alpha-olefin copolymer. The lubricant system includes a first component, a second component, and a third component. The first component is a carboxylic acid selected from the group consisting of stearic acid, lauric acid, myristic acid, palmitic acid, blends thereof, and combinations thereof. The second component is a hydrocarbon wax selected from the group consisting of a paraffin wax, polyolefin wax, blends thereof, and combinations thereof. The third component is a metal soap selected from the group consisting of calcium stearate, aluminum stearate, copper stearate, lithium stearate, magnesium stearate, sodium stearate, zinc stearate, blends thereof, and combinations thereof. The process for preparing the impact resistant rigid vinyl chloride polymer composition of the instant invention includes the following steps: (1) providing a vinyl chloride polymer; (2) providing an impact modifier as described above; (3) providing a lubricant system as described above; (4) blending the vinyl chloride polymer, the impact modifier, and the lubricant system thereby forming the impact resistant rigid vinyl chloride polymer composition.

5 Claims, No Drawings

IMPACT RESISTANT RIGID VINYL CHLORIDE POLYMER COMPOSITION AND METHOD OF MAKING THE SAME

CROSS-REFERENCE TO RELATED APPLICATIONS

This application is a non-provisional application claiming priority from the U.S. Patent Application Ser. No. 60/783,237, filed on Mar. 17, 2006 entitled "An Impact Resistant Rigid Vinyl Chloride Polymer Composition and Method of Making the Same," the teachings of which are herein as if reproduced in fill hereinbelow.

FIELD OF INVENTION

The instant invention relates to an impact resistant rigid vinyl chloride polymer composition, and method of making the same.

BACKGROUND OF THE INVENTION

Polyvinyl chloride (PVC) is widely used in both its rigid and flexible forms in such applications as films, siding panels, sheets, pipes and tubing. However, because rigid PVC is a hard and brittle thermoplastic polymer, it is often mixed with a modifier to form a composition that is less prone to failure on impact. Known PVC modifiers include, but are not limited to, polyacrylic resins, butadiene-containing polymers such as methacrylate butadiene styrene terpolymers (MBS), and chlorinated polyethylene (CPE) resins.

U.S. Pat. Nos. 3,006,889 and 3,209,055 disclose the use of a broad range of chlorinated and chlorosulfonated polyethylenes in blends with PVC.

U.S. Pat. No. 4,185,075 discloses a stabilizer for chlorine containing resins including calcium hydroxide coated with a calcium salt of an organic acid.

U.S. Pat. No. 4,267,084 discloses a vinyl chloride polymer composition including an intimate mixture of a first vinyl chloride polymer containing a sulfide linkage in the molecular chain and a second vinyl chloride polymer having a higher molecular weight than the first polymer.

U.S. Pat. No. 4,873,005 discloses an extrusion lubricant for polyvinyl halide resins. The lubricant includes a hydrocarbon wax, a group II metal or a lead salt of a fatty acid, and an organic mercaptan.

U.S. Pat. No. 5,789,453 discloses a medium density chlorinated polyvinyl chloride foam having a specific gravity in the range of 0.3 to 1.5. The foam includes a chlorinated polyvinyl chloride, a blend of decomposition type blowing agent, a tin stabilizer, an optional impact modifier, and an optional high molecular weight process aid.

U.S. Pat. No. 5,925,703 discloses the use of linear ethylene/alpha-olefins to improve impact performance of filled thermoplastic compositions including polyvinyl chlorides.

U.S. Pat. No. 5,985,959 discloses stabilized chlorinated polymer compositions based on polymer and/or copolymers of vinyl chloride including organotin salts and/or one or more divalent metal salts of a carboxylic acid or phenol, and one or more metal salts.

U.S. Pat. No. 6,124,406 discloses that blocky chlorinated polyethylenes can be used to compatibilize hydrocarbon rubber and PVC to give a PVC composition with improved impact resistance.

U.S. Pat. No. 6,140,403 discloses a vinyl halide resin composition containing a metal compound stabilizer, and coated acid absorber particles. The coating consists of a tin based coating or a complex calcium/zinc/strontium phosphate-based coating to confer heat stability to the vinyl halide composition.

U.S. Pat. No. 6,573,318 discloses a halogen-containing polymer composition including a latent mercaptan-containing heat stabilizer composition.

U.S. Pat. No. 6,706,815 discloses an improved impact resistant polyvinyl chloride composition including a vinyl chloride polymer, at least one ethylene/alpha-olefin copolymer, at least one randomly chlorinated olefin polymer, and optionally inorganic fillers.

U.S. Pat. No. 6,849,694 discloses an improved impact resistant polyvinyl chloride composition including a vinyl chloride polymer and 2-8 parts of an impact modifier composition. The impact modifier composition includes at least one ethylene/alpha-olefin copolymer and at least one chlorinated olefin polymer.

U.S. Pat. No. 6,900,254 discloses process for preparing a powdery high rubber impact modifier containing two or more populations of polymer particles having a total rubbery weight fraction of greater than 90 percent.

European Patent Application No. 0 529 76 A1 discloses a multilayer composition comprising a first layer, and a second. First layer includes polyvinyl chloride, at least one stabilizer for polyvinyl chloride, and at least one lubricant. The second layer includes polyvinyl chloride, at least one stabilizer for polyvinyl chloride, at least one lubricant, and at least one heat distortion improving agent.

Japanese Published Patent Application No. 2-45543, discloses vinyl chloride resin compositions containing 1-10 parts by weight of a chlorinated polyethylene and 1-10 parts by weight of an ethylene/alpha-olefin copolymer per 100 parts of the vinyl chloride resin.

Japanese Published Patent Application No. 7-11085 discloses the use of a mixture of a chlorinated polyethylene prepared from a polyethylene of molecular weight 50,000 to 400,000 and AES resin (acrylonitrile-EPDM-styrene), optionally in combination with other polymers, as an impact modifier for PVC.

Despite the research efforts in developing and improving the impact resistance, gloss, and processibility of rigid vinyl chloride polymer compositions, there is still a need for further improvement of the impact resistance, gloss, and processibility of the rigid vinyl chloride polymer compositions.

SUMMARY OF THE INVENTION

The instant invention is an impact resistant rigid vinyl chloride polymer composition, and method of making the same. The impact resistant rigid vinyl chloride polymer composition, according to instant invention, includes a vinyl chloride polymer, an impact modifier, and a lubricant system. The impact modifier includes a chlorinated olefin polymer, and an ethylene/alpha-olefin copolymer. The lubricant system includes a first component, a second component, and a third component. The first component is a carboxylic acid selected from the group consisting of stearic acid, lauric acid, myristic acid, palmitic acid, blends thereof, and combinations thereof. The second component is a hydrocarbon wax selected from the group consisting of a paraffin wax, polyolefin wax, blends thereof, and combinations thereof. The third component is a metal soap selected from the group consisting of calcium stearate, aluminum stearate, copper stearate, lithium stearate, magnesium stearate, sodium stearate, zinc stearate, blends thereof, and combinations thereof. The process for preparing the impact resistant rigid vinyl chloride polymer composition of the instant invention includes the following steps: (1) providing a vinyl chloride polymer; (2) providing an impact modifier as described above; (3) providing a lubricant system as described above; (4) blending the vinyl chloride polymer, the impact modifier, and the lubricant system thereby forming the impact resistant rigid vinyl chloride polymer composition.

DETAILED DESCRIPTION OF THE INVENTION

The impact resistant rigid vinyl chloride polymer composition, according to instant invention, includes a vinyl chloride polymer, an impact modifier, and a lubricant system. The impact resistant rigid composition may further include additional components.

The vinyl chloride polymer component is high molecular weight polymer that may be a polyvinyl chloride homopolymer or a copolymer of vinyl chloride having copolymerized units of one or more additional comonomers. Such homopolymers and copolymers may be prepared by any suitable polymerization methods including, but not limited to, mass, suspension, dispersion, and emulsion processes. Polymers prepared using a suspension process are preferred.

When additional comonomers are present, such comonomers may account for up to 20 weight percent of the copolymer, preferably from 1-5 weight percent of the copolymer. Examples of suitable comonomers include, but are not limited to, $C_2$-$C_6$ olefins, for example ethylene and propylene; vinyl esters of straight chain or branched $C_2$-$C_4$ carboxylic acids, such as vinyl acetate, vinyl propionate, and vinyl 2-ethyl hexanoate; vinyl halides, for example vinyl fluoride, vinylidene fluoride or vinylidene chloride; vinyl ethers, such as vinyl methyl ether and butyl vinyl ether; vinyl pyridine; unsaturated acids, for example maleic acid, fumaric acid, methacrylic acid and their mono- or diesters with $C_1$-$C_{10}$ mono- or dialcohols; maleic anhydride, maleic acid amide as well as the N-substitution products of maleic acid amide with aromatic, cycloaliphatic and optionally branched aliphatic substituents; acrylonitrile and styrene. Such homopolymers and copolymers are commercially available from, for example, Georgia Gulf Chemicals & Vinyls, LLC of Aberdeen, Miss., and Shintech, Inc. of Houston, Tex.

Graft copolymers of vinyl chloride are also suitable for use in the instant invention. For example, ethylene copolymers, such as ethylene vinyl acetate, and ethylene copolymer elastomers, such as EPDM (copolymers comprising copolymerized units of ethylene, propylene and dienes) and EPR (copolymers comprising copolymerized units of ethylene and propylene) that are grafted with vinyl chloride may be used as the vinyl chloride polymer component. A commercially available example of such a polymer is Vinnol® 550, available from Wacker Chemie GmbH, Germany.

The impact modifier includes a chlorinated olefin polymer, and an ethylene/alpha-olefin copolymer. The impact modifier may comprise any amounts of the chlorinated olefin polymer or the ethylene/alpha-olefin copolymer. For example, the impact modifier may comprise from 10 to 90 percent by weight of the chlorinated olefin polymer, based on the total weight of the impact modifier, and it may comprise from 10 to 90 percent by weight of the ethylene/alpha-olefin copolymer, based on the total weight of the impact modifier. The impact resistant rigid vinyl chloride polymer composition of the instant invention may contain any amounts of the impact modifier; for example, it may contain 2 to 20 parts by weight of the impact modifier per 100 parts by weight of the vinyl chloride polymer. Preferably, the impact resistant rigid vinyl chloride polymer composition may contain 2 to 5 parts by weight of the impact modifier per 100 parts by weight of the vinyl chloride polymer. Such impact modifiers are commercially available, for example, under the trade name ENLITE™ from Dow Chemical Company, Midland, Mich.

The chlorinated olefin polymer component of the impact modifier may be any chlorinated olefin polymer; for example, the chlorinated olefin polymer may be selected from the group consisting of chlorinated polyethylene homopolymers, and chlorinated copolymers that contain copolymerized units of ethylene, and a copolymerizable monomer. The chlorinated olefin polymer may optionally include chlorosulfonyl groups, that is the polymer chain will have pendant chlorine groups and chlorosulfonyl groups. Such polymers are generally known as chlorosulfonated olefin polymers.

Representative chlorinated olefin polymers include, but are not limited to, a) chlorinated and chlorosulfonated homopolymers of ethylene, and b) chlorinated and chlorosulfonated copolymers of ethylene, and at least one ethylenically unsaturated monomer selected from the group consisting of $C_3$-$C_{10}$ alpha monoolefins, $C_1$-$C_{12}$ alkyl esters of $C_3$-$C_{20}$ monocarboxylic acids, unsaturated $C_3$-$C_{20}$ mono- or dicarboxylic acids, anhydrides of unsaturated $C_4$-$C_8$ dicarboxylic acids, and vinyl esters of saturated $C_2$-$C_{18}$ carboxylic acids. Chlorinated and chlorosulfonated graft copolymers are also included. Specific examples of suitable polymers include, but are not limited to, chlorinated polyethylene, chlorosulfonated polyethylene, chlorinated ethylene vinyl acetate copolymers, chlorosulfonated ethylene vinyl acetate copolymers, chlorinated ethylene acrylic acid copolymers, chlorosulfonated ethylene acrylic acid copolymers, chlorinated ethylene methacrylic acid copolymers, chlorosulfonated ethylene methacrylic acid copolymers, chlorinated ethylene methyl acrylate copolymers, chlorinated ethylene methyl methacrylate copolymers, chlorinated ethylene n-butyl methacrylate copolymers, chlorinated ethylene glycidyl methacrylate copolymers, chlorinated graft copolymers of ethylene and maleic acid anhydride, chlorinated copolymers of ethylene with propylene, butene, 3-methyl-1-pentene, or octane, and chlorosulfonated copolymers of ethylene with propylene, butene, 3-methyl-1-pentene or octene. The copolymers may be dipolymers, terpolymers, or higher order copolymers. Chlorinated olefin polymers may preferably be chlorinated polyethylene.

The chlorinated olefin polymers and chlorosulfonated olefin polymers may be prepared from polyolefin resins that are branched or unbranched. The polyolefin base resins may be prepared by free radical processes, Ziegler-Natta catalysis or catalysis with metallocene catalyst systems, for example those disclosed in U.S. Pat. Nos. 5,272,236 and 5,278,272. Chlorination or chlorosulfonation of the base resins may take place in suspension, solution, solid state, or fluidized bed. Free radical suspension chlorination processes are described and taught in U.S. Pat. No. 3,454,544, U.S. Pat. No. 4,767,823 and references cited therein. Such processes involve preparation of an aqueous suspension of a finely divided ethylene polymer that is then chlorinated. An example of a free radical solution chlorination process is disclosed in U.S. Pat. No. 4,591,621. The polymers may also be chlorinated in the melt or fluidized beds, for example as taught in U.S. Pat. No. 4,767,823. Chlorosulfonation processes are generally performed in solution, but suspension and non-solvent processes are also known. Preparation of chlorosulfonated olefin polymers is described in U.S. Pat. Nos. 2,586,363; 3,296,222; 3,299,014; and 5,242,987.

Ethylene/alpha-olefin copolymers are copolymers of ethylene with at least one $C_3$-$C_8$ alpha-olefin (preferably an aliphatic alpha-olefin) comonomer, and optionally, a polyene comonomer, for example, a conjugated diene, a nonconjugated diene, a triene, etc. Examples of the $C_3$-$C_8$ alpha-olefins include, but are not limited to, propene, 1-butene, 4-methyl-1-pentene, 1-hexene, and 1-octene. The alpha-olefin may also contain a cyclic structure such as cyclohexane or cyclopentane, resulting in an alpha-olefin such as 3-cyclohexyl-1-propene (allyl-cyclohexane) and vinyl-cyclohexane. Although not alpha-olefins in the classical sense of the term, for purposes of this invention certain cyclic olefins, such as norbornene and related olefins, are alpha-olefins and may be used in place of some or all of the alpha-olefins described above. Similarly, styrene and its related olefins (for example, alpha-methylstyrene, etc.) are alpha-olefins for purposes of this invention.

Polyenes are unsaturated aliphatic or alicyclic compounds containing more than four carbon atoms in a molecular chain and having at least two double and/or triple bonds, for example, conjugated and nonconjugated dienes and trienes. Examples of nonconjugated dienes include aliphatic dienes such as 1,4-pentadiene, 1,4-hexadiene, 1,5-hexadiene, 2-methyl-1,5-hexadiene, 1,6-heptadiene, 6-methyl-1,5-heptadiene, 1,6-octadiene, 1,7-octadiene, 7-methyl-1,6-octadiene, 1,13-tetradecadiene, 1,19-eicosadiene; cyclic dienes such as 1,4-cyclohexadiene, bicyclo[2.2.1]hept-2,5-diene, 5-ethylidene-2-norbornene, 5-methylene-2-norbornene, 5-vinyl-2-norbornene, bicyclo[2.2.2]oct-2,5-diene, 4-vinylcyclohex-1-ene, bicyclo[2.2.2]oct-2,6-diene, 1,7,7-trimethylbicyclo-[2.2.1]hept-2,5-diene, dicyclopentadiene, methyltetrahydroindene, 5-allylbicyclo[2.2.1]hept-2-ene, 1,5-cyclooctadiene; aromatic dienes such as 1,4-diallylbenzene, 4-allyl-1H-indene; and trienes such as 2,3-diisopropenylidiene-5-norbornene, 2-ethylidene-3-isopropylidene-5-norbornene, 2-propenyl-2,5-norbornadiene, 1,3,7-octatriene, 1,4,9-decatriene; with 5-ethylidene-2-norbornene, 5-vinyl-2-norbornene and 7-methyl-1,6-octadiene preferred nonconjugated dienes.

Examples of conjugated dienes include, but are not limited to, butadiene, isoprene, 2,3-dimethylbutadiene-1,3, 1,2-dimethylbutadiene-1,3, 1,4-dimethylbutadiene-1,3, 1-ethylbutadiene-1,3, 2-phenylbutadiene-1,3, hexadiene-1,3, 4-methylpentadiene-1,3, 1,3-pentadiene ($CH_3CH=CH-CH=CH_2$; commonly called piperylene), 3-methyl-1,3-pentadiene, 2,4-dimethyl-1,3-pentadiene, 3-ethyl-1,3-pentadiene; with 1,3-pentadiene a preferred conjugated diene.

Examples of trienes include, but are not limited to, 1,3,5-hexatriene, 2-methyl-1,3,5-hexatriene, 1,3,6-heptatriene, 1,3,6-cycloheptatriene, 5-methyl-1,3,6-heptatriene, 5-methyl-1,4,6-heptatriene, 1,3,5-octatriene, 1,3,7-octatriene, 1,5,7-octatriene, 1,4,6-octatriene, 5-methyl-1,5,7-octatriene, 6-methyl-1,5,7-octatriene, 7-methyl-1,5,7-octatriene, 1,4,9-decatriene and 1,5,9-cyclodecatriene.

Exemplary copolymers include, but are not limited to, ethylene/propylene, ethylene/butene, ethylene/1-octene, ethylene/5-ethylidene-2-norbornene, ethylene/5-vinyl-2-norbornene, ethylene/-1,7-octadiene, ethylene/7-methyl-1,6-octadiene, ethylene/styrene and ethylene/1,3,5-hexatriene. Exemplary terpolymers include, but are not limited to, ethylene/propylene/1-octene, ethylene/butene/1-octene, ethylene/propylene/5-ethylidene-2-norbornene, ethylene/butene/5-ethylidene-2-norbornene, ethylene/butene/styrene, ethylene/1-octene/5-ethylidene-2-norbornene, ethylene/propylene/1,3-pentadiene, ethylene/propylene/7-methyl-1,6-octadiene, ethylene/butene/7-methyl-1,6-octadiene, ethylene/1-octene/1,3-pentadiene and ethylene/propylene/1,3,5-hexatriene. Exemplary tetrapolymers include, but are not limited to, ethylene/propylene/1-octene/diene (for example ENB), ethylene/butene/1-octene/diene and ethylene/propylene/mixed dienes, for example, ethylene/propylene/5-ethylidene-2-norbornene/piperylene.

The ethylene/alpha-olefin polymer components of this invention may be produced using any conventional ethylene/alpha-olefin polymerization technology generally known in the art. For example, polymerization of the ethylene/alpha-olefin polymer may be accomplished at conditions well known in the art for Ziegler-Natta or Kaminsky-Sinn type polymerization reactions. The ethylene/alpha-olefin polymer components of this invention may also be made using a mono- or bis-cyclopentadienyl, indenyl, or fluorenyl transition metal (preferably Group 4) catalysts or constrained geometry catalysts. Suspension, solution, slurry, gas phase, solid-state powder polymerization, or other process conditions may be employed if desired. A support, such as silica, alumina, or a polymer (such as polytetrafluoroethylene or a polyolefin) may also be employed if desired.

Inert liquids serve as suitable solvents for polymerization. Examples include straight and branched-chain hydrocarbons such as isobutane, butane, pentane, hexane, heptane, octane, and mixtures thereof; cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes; and aromatic and alkyl-substituted aromatic compounds such as benzene, toluene, xylene, and ethylbenzene. Suitable solvents also include liquid olefins that may act as monomers or comonomers including butadiene, cyclopentene, 1-hexene, 4-vinylcyclohexene, vinylcyclohexane, 3-methyl-1-pentene, 4-methyl-1-pentene, 1,4-hexadiene, 1-octene, 1-decene, styrene, divinylbenzene, allylbenzene, and vinyltoluene (including all isomers alone or in admixture). Mixtures of the foregoing are also suitable. If desired, normally gaseous olefins can be converted to liquids by application of pressure and used herein.

The lubricant system includes a first component, a second component, and a third component. The impact resistant rigid vinyl chloride polymer composition of the instant invention may contain any amounts of the lubricant system; for example, it may contain 2 to 10 parts by weight of the lubricant system per 100 parts by weight of the vinyl chloride polymer. Preferably, the impact resistant rigid vinyl chloride polymer composition of the instant invention may contain 2 to 5 parts by weight of the lubricant system per 100 parts by weight of the vinyl chloride polymer.

The first component may be any carboxylic acid. For example, first component may be a carboxylic acid selected from the group consisting of stearic acid, lauric acid, myristic acid, palmitic acid, blends thereof, and combinations thereof. Preferably, the first component may be stearic acid. The lubricant system may comprise any amounts of the first component; for example, the lubricant system may comprise 0.5 to 1.5 parts by weight of the first component based on 100 parts of the vinyl chloride polymer. Preferably, the lubricant system may comprise 0.5 to 1.0 parts by weight of the first component based on 100 parts of the vinyl chloride polymer. Such carboxylic acids are commercially available, for example, under the name Emersol 120 from Cognis, Cincinnati, Ohio.

The second component may be any hydrocarbon wax. For example, the second component may be a hydrocarbon wax selected from the group consisting of paraffin wax, polyolefin wax, blends thereof, and combinations thereof. Preferably, the second component may be a paraffin wax. The lubricant system may comprise any amounts of the second component; for example, the lubricant system may comprise 0.3 to 2.0 parts by weight of the second component based on 100 parts of the vinyl chloride polymer. Preferably, the lubricant system may comprise 0.6 to 1.3 parts by weight of the second component based on 100 parts of the vinyl chloride polymer. Such hydrocarbons are commercially available, for example, under the name Rheolube RL165 from Honeywell, Morristown, N.J.

The third component may be any metal soap; for example, the third component may be a metal soap selected from the group consisting of calcium stearate, aluminum stearate, copper stearate, lithium stearate, magnesium stearate, sodium stearate, zinc stearate, blends thereof, and combinations thereof. Preferably, the third component may be calcium stearate. The lubricant system may comprise any amounts of third component; for example, the lubricant system may comprise 0.3 to 1.5 parts by weight of the third component based on 100 parts by weight of the vinyl chloride polymer. Preferably, the lubricant system may comprise 0.5 to 1.5 parts by weight of the third component based on 100 parts by weight of the vinyl chloride polymer. Such metal soaps are commercially available, for example, under the name Calcium Stearate FG from Chemtura, Middlebury, Conn.

The impact resistant rigid vinyl chloride polymer composition of the instant invention may further include additional components including, but not limited to, fillers, and additional compounding ingredients. Exemplary fillers include, but are not limited to, silica, clay, titanium dioxide, talc, calcium carbonate, and other mineral fillers. Exemplary additional compounding ingredients include, but are not limited to, stabilizers, blowing agents, pigments, colorants, process aids, plasticizers, crosslinking agents, antioxidants, heat stabilizing ingredients, antistatic agents and combinations thereof. The use of such additional compounding ingredients facilitates the tailoring of the impact resistant rigid vinyl chloride polymer compositions of the instant invention thereby facilitating their wide range of applications. The impact resistant rigid vinyl chloride polymer composition may comprise from 0.1 to 50 parts by weight of the additional components per 100 parts by weight of vinyl chloride polymer. Preferably, the impact resistant rigid vinyl chloride polymer composition may comprise from 0.1 to 25 parts by weight of the additional components per 1000 parts by weight of vinyl chloride polymer.

The impact resistant rigid vinyl chloride polymer composition of the instant invention may have a gloss in the range of 15 to 70 percent reflected light. Preferably, the impact resistant rigid vinyl chloride polymer composition of the instant invention may have a gloss in the range of 20 to 50 percent reflected light. The impact resistant rigid vinyl chloride polymer composition of the instant invention may have an impact strength in the range of 1 to 13 J/mm. Preferably, the impact resistant rigid vinyl chloride polymer composition of the instant invention may have an impact strength in the range of 4 to 13 J/mm. The impact resistant rigid vinyl chloride polymer composition of the instant invention may have melt viscosity in the range of 6000 to 25000 Pa-s. Preferably, the impact resistant rigid vinyl chloride polymer composition of the instant invention may have a melt viscosity in the range of 8000 to 15000 Pa-s.

In production, the vinyl chloride polymer, the impact modifier, and the lubricant system are blended together thereby forming the impact resistant rigid vinyl chloride polymer composition of the present invention. The impact modifier may be produced prior to blending step, or in the alternative, it may be produced simultaneously with the blending step. The lubricant system may be produced prior to blending step; or in the alternative, it may be produced simultaneously with the blending step. The impact resistant rigid vinyl chloride polymer compositions of the instant invention are physical blends of polymers; thus, they do not require crosslinking or vulcanization in order to be useful as commercial products. Blending may be facilitated via any method generally known in the art; for example, blending may be facilitated via a high-intensity dry blend mixer, a compounding extruder, a tumble blender, a ribbon mixer, a Banbury type mixer, or any other mixing equipment.

In alternative production, the vinyl chloride polymer, the impact modifier, the lubricant system, and one or more additional components, as described above, are blended together thereby forming the impact resistant rigid vinyl chloride polymer composition of the present invention. The impact modifier may be produced prior to blending step, or in the alternative, it may be produced simultaneously with the blending step. The lubricant system may be produced prior to blending step; or in the alternative, it may be produced simultaneously with the blending step. The impact resistant rigid vinyl chloride polymer compositions of the instant invention are physical blends of polymers; thus, they do not require crosslinking or vulcanization in order to be useful as commercial products. Blending may be facilitated via any method generally known in the art; for example, blending may be facilitated via a high-intensity dry blend mixer, a compounding extruder, a tumble blender, a ribbon mixer, a Banbury type mixer, or any other mixing equipment.

Typical end use applications for the impact resistant rigid vinyl chloride polymer compositions of the instant invention include, but are not limited to, sheets, window profiles, fences, siding panels, decks, and pipes. Generally known methods such as extrusion, injection molding, compression molding may be employed to form articles such as sheets, window profiles, fences, siding panels, decks, and pipes.

Test Methods

Test methods include the following:

Evaluation for Specular Gloss was accomplished according to ASTM Test Method No. D523-89 (1999) using a 75 degree Gardiner gloss meter.

Evaluation for High Speed Puncture of Plastic Using Load and Displacement Sensors was accomplished according to ASTM Test Method No. D3763-02 (2002) using Instron Corp. Dyantup® 920 instrumented dart impact tester at 73° F. (23° C.), and 14° F. (−10° C.).

Evaluation for Melt Flow Rates of Thermoplastics by Extrusion Plastometer was accomplished according to ASTM Test Method No. D1238-04c (2004) using Kayeness Capillary Rheometer at 374° F. (190° C.), and a Barrel to die ratio of 30:1. Winkars 1.6 software was used to conduct the testing.

EXAMPLES

The following examples illustrate the present invention, but are not intended to limit the scope of the invention.

Example 1

An impact resistant rigid vinyl chloride polymer composition was prepared in a high-intensity PVC dry blend mixer according to the following procedure: Referring to Table I, 100 parts of ShinTec SE 950 PVC was added to the mixer, and the contents were heated until the temperature reached 122° F. (50° C.). 1 part of Advastab® TM-286 SP tin stabilizer was added to the mixer, and blending was continued. When a temperature of 149° F. (65° C.) was reached, 1 part of Paraloid® K120N acrylic process aid, 1 part of Emersol 120 stearic acid, 1 part of RSN-11 calcium stearate, 1 of part XL165 paraffin wax, 3.3 parts of ENLITE™ were added to the mixer, and blending was continued. When a Temperature of 167° F. (75° C.) was reached, 0.25 part of Ti-Pure® R-960 titanium dioxide, and 15 parts of Omyacarb® UFT calcium carbonate filler were added to the mixer, and blending was continued. Blending at 65 percent load factor was continued until a temperature of 203° F. (95° C.) was reached after about 3 minutes. The mixture was then transferred into an externally cooled blender at 122° F. (50° C.). Once the temperature of the mixture reached 122° F. (50° C.), the mixture was removed, and approximately 175 lbs of the impact resistant rigid vinyl chloride polymer composition was collected. The impact resistant rigid vinyl chloride polymer composition was allowed to rest for 24 hours at a temperature of 73° F. (23° C.).

Subsequently, the impact resistant rigid vinyl chloride polymer composition was extruded via a CM-55 counter-rotating conical twin-screw extruder at approximately 450 lbs/hour output, and a melt pressure of approximately 3000 psig. The screws were 55 mm tapered and vented, and with a L/D ratio of 22:1. A 17 inch sheet die was used. The extruder was divided in four heating zones. The first zone was Zone 1 and it was set at 365° F. (185° C.). The second zone was Zone 2, and it was set at 385° F. (196° C.). The third zone was Zone 3, and it was set at 365° F. (185° C.). The fourth zone was Zone 4, and it was set at 365° F. (185° C.). The fifth zone was the Adapter Zone, and it was set to 355° F. (179° C.). The sixth and seventh zones were the die, and they were both set at 350° F. (177° C.). Zones 2-4 had liquid-cooling capability. The extruder revolution/minute (RPM) was set at 1950 motor speed, driven through a 59:1 gear reduction to turn the twin screws at approximately 33 rpm. The extruded vinyl compound had an infrared hand held measurement melt temperature of greater that 374° F. (190° C.).

The compound was introduced into the extruder via a hopper and a feed screw that was controlled to facilitate 450 lbs/hour output. The sheet was drawn down with an embossed metal two roll take up unit through a water bath to an electric siding puller, and then to a cutting table to produce a sheet with a final siding sheet of 12 inches in width.

The extruded sheet was tested for Specular Gloss, Impact Strength, and Melt Flow Rates, and the results are shown in Tables II, III, and IV respectively.

Comparative Example A

A comparative impact resistant rigid vinyl chloride polymer composition was prepared in a high-intensity PVC dry blend mixer according to the following procedure: Referring to Table I, 100 parts of ShinTec SE 950 PVC was added to the mixer, and the contents were heated until the temperature reached 122° F. (50° C.). 1 part of Advastab® TM-286 SP tin stabilizer was added to the mixer, and blending was continued. When a Temperature of 149° F. (65° C.) was reached, 1 part of Paraloid® K120N acrylic process aid, 0.5 part of Licolub® FA-1 ethylene bis-stearamide wax, 0.7 part of RSN-11 calcium stearate, 1.1 of parts XL165 paraffin wax, and 3.3 parts of ENLITE™ were added to the mixer, and blending was continued. When a temperature of 167° F. (75° C.) was reached, 0.25 part of Ti-Pure® R-960 titanium dioxide, and 15 parts of Omyacarb® UFT calcium carbonate filler were added to the mixer, and blending continued. Blending at 65 percent load factor was continued until a temperature of 203° F. (95° C.) was reached after about 3 minutes. The mixture was then transferred into an externally cooled blender at 122° F. (50° C.). Once the temperature of the mixture reached 122° F. (50° C.), the mixture was removed, and approximately 175 lbs of the impact resistant rigid vinyl chloride polymer composition was collected. The impact resistant rigid vinyl chloride polymer composition was allowed to rest for 24 hours at a temperature of 73° F. (23° C.).

Subsequently, the impact resistant rigid vinyl chloride polymer composition was extruded via a CM-55 counter-rotating conical twin-screw extruder at approximately 450 lbs/hour output, and a melt pressure of approximately 3000 psig. The screws were 55 mm tapered and vented, and with a L/D ratio of 22:1. A 17 inch sheet die was used. The extruder was divided in four heating zones. The first zone was Zone 1, and it was set at 365° F. (185° C.). The second zone was Zone 2, and it was set at 385° F. (196° C.). The third zone was Zone 3, and it was set at 365° F. (185° C.). The fourth zone was Zone 4, and it was set at 365° F. (185° C.). The fifth zone was the Adapter Zone, and it was set to 355° F. (179° C.). The sixth and seventh zones were the die, and they were both set at 350° F. (177° C.). Zones 2-4 had liquid-cooling capability. The extruder revolution/minute (RPM) was set at 1950 motor speed, driven through a 59:1 gear reduction to turn the twin screws at approximately 33 rpm. The extruded vinyl compound had an infrared hand held measurement melt temperature of greater that 374° F. (190° C.).

The compound was introduced into the extruder via a hopper and a feed screw that was controlled to facilitate a 450 lbs/hour output. The sheet was drawn down with an embossed metal two roll take up unit through a water bath to an electric siding puller, and then to a cutting table to produce a sheet with a final siding sheet of 12 inches in width.

The extruded comparative sheet was tested for Specular Gloss, Impact Strength, and Melt Flow Rates, and the results are shown in Tables II, III, and IV respectively.

TABLE I

| Component | Source | Example 1 (Parts Per 100 Parts of PVC) | Comparative Example A (Parts Per 100 Parts of PVC) |
|---|---|---|---|
| ShinTec SE 950 PVC | Shintec, Inc. Houston, TX | 100 | 100 |
| Advastab ® TM-286 SP tin stabilizer | Rohm and Haas Comp. Spring House, PA | 1 | 1 |
| Ti-Pure ® R-960 titanium dioxide | The I.E. DuPont de Nemours Corp. | 0.25 | 0.25 |
| Paraloid ® K120N acrylic process aid | Rohm and Haas Comp. Spring House, PA | 1 | 1 |
| Omyacarb ® UFT calcium carbonate filler | Omya, Inc of Proctor, VT | 15 | 15 |
| RSN-11 calcium stearate | Mallinckrodt Hazelwood, MO | 1 | 0.7 |
| XL165 paraffin wax | Clariant Corp. Charlotte, NC | 1.1 | 1 |
| Emersol 120 stearic acid | Cognis Cincinnati, OH | 1 | 0 |
| Licolub ® FA-1 ethylene bis-stearamide | Clariant Corp. Charlotte, NC | 0 | 0.5 |
| ENLITE ™ | The Dow Chemical Company Midland, MI | 3.3 | 3.3 |

TABLE II

| Gloss | |
|---|---|
| Example 1 | Comparative Example A |
| 45 percent | 38 percent |

TABLE III

| | Impact Strength | |
|---|---|---|
| Conditions | Example 1 J/mm | Comparative Example A J/mm |
| 73° F. (23° C.) | 7.04 | 7.80 |
| 14° F. (−10° C.) | 5.05 | 4.70 |

TABLE IV

| | Melt Viscosity | |
|---|---|---|
| Shear Rate | Example 1 Pa-s | Comparative Example A Pa-s |
| 7 | 11242 | 21967 |
| 24 | 5911 | 9102 |
| 61 | 3586 | 4592 |
| 194 | 1957 | 2222 |
| 593 | 954 | 1053 |

The present invention may be embodied in other forms without departing from the spirit and the essential attributes thereof, and, accordingly, reference should be made to the appended claims, rather than to the forgoing specifications as indicating the scope of the invention.

We claim:

1. An impact resistant rigid vinyl chloride polymer composition consisting essentially of:
    a vinyl chloride polymer;
    2 to 5 parts by weight of an impact modifier system, based on 100 parts of said vinyl chloride polymer, wherein said impact modifier system comprises:
        a chlorinated olefin polymer; and
        an ethylene/alpha-olefin copolymer; and
    a lubricant system comprising:
        0.5 to 1.5 parts by weight of a carboxylic acid, based on 100 parts of said vinyl chloride polymer, wherein said carboxylic acid is selected from the group consisting of stearic acid, lauric acid, myristic acid, palmitic acid, blends thereof, and combinations thereof;
        0.3 to 2.0 parts by weight of a hydrocarbon wax, based on 100 parts of said vinyl chloride polymer, wherein said hydrocarbon wax is selected from the group consisting of a paraffin wax, polyolefin wax, blends thereof, and combinations thereof; and
        0.3 to 1.5 parts by weight of a metal soap, based on 100 parts of said vinyl chloride polymer, wherein said metal soap is selected from the group consisting of calcium stearate, aluminum stearate, copper stearate, lithium stearate, magnesium stearate, sodium stearate, zinc stearate, blends thereof, and combinations thereof.

2. The impact resistant rigid vinyl chloride polymer composition according to claim 1, wherein said carboxylic acid is stearic acid, said hydrocarbon wax is a paraffin wax, and said metal soap is calcium stearate.

3. A process for preparing an impact resistant rigid vinyl chloride polymer composition comprising
    providing a vinyl chloride polymer;
    providing 2 to 5 parts by weight of an impact modifier system, based on 100 parts of said vinyl chloride polymer, wherein said impact modifier system comprises;
        a chlorinated olefin polymer; and
        an ethylene/alpha-olefin copolymer; and
    providing a lubricant system comprising:
        0.5 to 1.5 parts by weight of a carboxylic acid, based on 100 parts of said vinyl chloride polymer, wherein said carboxylic acid is selected from the group consisting of stearic acid, lauric acid, myristic acid, palmitic acid, blends thereof, and combinations thereof;
        0.3 to 2.0 parts by weight of a hydrocarbon wax, based on 100 parts of said vinyl chloride polymer, wherein said hydrocarbon wax is selected from the group consisting of a paraffin wax, polyolefin wax, blends thereof, and combinations thereof; and
        0.3 to 1.5 parts by weight of a metal soap, based on 100 parts of said vinyl chloride polymer, wherein said metal soap is selected from the group consisting of calcium stearate, aluminum stearate, copper stearate, lithium stearate, magnesium stearate, sodium stearate, zinc stearate, blends thereof, and combinations thereof;
    blending said vinyl chloride polymer, said impact modifier system, and said lubricant system thereby forming said impact resistant rigid PVC composition.

4. The process for preparing an impact resistant rigid vinyl chloride polymer composition according to claim 3, wherein said process further comprises the step of extruding said impact resistant rigid vinyl chloride polymer.

5. An article comprising:
    an impact resistant rigid vinyl chloride polymer composition comprising:
        a vinyl chloride polymer;
        2 to 5 parts by weight of an impact modifier system, based on 100 parts of said vinyl chloride polymer, wherein said impact modifier system comprises:
            a chlorinated olefin polymer; and
            an ethylene/alpha-olefin copolymer; and
        a lubricant system comprising:
            0.5 to 1.5 parts by weight of a carboxylic acid, based on 100 parts of said vinyl chloride polymer, wherein said carboxylic acid is selected from the group consisting of stearic acid, lauric acid, myristic acid, palmitic acid, blends thereof, and combinations thereof;
            0.3 to 2.0 parts by weight of a hydrocarbon wax, based on 100 parts of said vinyl chloride polymer, wherein said hydrocarbon wax is selected from the group consisting of a paraffin wax, polyolefin wax, blends thereof, and combinations thereof; and
            0.3 to 1.5 parts by weight of a metal soap, based on 100 parts of said vinyl chloride polymer, wherein said metal soap is selected from the group consisting of calcium stearate, aluminum stearate, copper stearate, lithium stearate, magnesium stearate, sodium stearate, zinc stearate, blends thereof, and combinations thereof.

* * * * *